United States Patent
Kim et al.

(10) Patent No.: US 8,553,695 B2
(45) Date of Patent: Oct. 8, 2013

(54) TCP ACK PACKET TRANSMISSION AND RECEPTION METHOD, AND A DEVICE SUPPORTING THE SAME

(75) Inventors: Bong Ho Kim, San Jose, CA (US); Ye Rang Hur, Seoul (KR)

(73) Assignee: Intellectual Discovery Co., Ltd. (KR)

( * ) Notice: Subject to any disclaimer, the term of this patent is extended or adjusted under 35 U.S.C. 154(b) by 147 days.

(21) Appl. No.: 12/989,615

(22) PCT Filed: Apr. 25, 2009

(86) PCT No.: PCT/KR2009/002176
§ 371 (c)(1),
(2), (4) Date: Jan. 18, 2011

(87) PCT Pub. No.: WO2009/131425
PCT Pub. Date: Oct. 29, 2009

(65) Prior Publication Data
US 2011/0103379 A1    May 5, 2011

Related U.S. Application Data

(60) Provisional application No. 61/048,166, filed on Apr. 25, 2008.

(30) Foreign Application Priority Data

Apr. 24, 2009 (KR) .................. 10-2009-0036259

(51) Int. Cl.
*H04L 1/00* (2006.01)
*H04L 12/26* (2006.01)
*H04L 12/28* (2006.01)
*H04L 12/56* (2011.01)

(52) U.S. Cl.
USPC ............................................ 370/392; 370/235

(58) Field of Classification Search
USPC .................. 370/229, 235, 389, 392
See application file for complete search history.

(56) References Cited

U.S. PATENT DOCUMENTS

| | | | | |
|---|---|---|---|---|
| 2006/0104288 A1* | 5/2006 | Yim et al. | ................ | 370/395.52 |
| 2007/0177435 A1* | 8/2007 | Beach | ...................... | 365/189.05 |
| 2008/0130561 A1* | 6/2008 | Shao et al. | ..................... | 370/329 |

FOREIGN PATENT DOCUMENTS

| | | |
|---|---|---|
| JP | 2005-176075 A | 6/2005 |
| KR | 10-2006-0096968 A | 9/2006 |
| KR | 10-0651469 B1 | 11/2006 |
| KR | 10-2007-0120684 A | 12/2007 |

* cited by examiner

*Primary Examiner* — Ronald Abelson

(57) ABSTRACT

Disclosed is a broadband wireless network, and more particularly, to a method for transmitting and receiving a TCP ACK packet, and a device supporting the same, wherein the method for transmitting and receiving a TCP ACK packet receiving TCP ACK packets and data packets from an upper layer; creating a MAC PDU by unifying the TCP ACK packet and data packet buffered in the same queue among the received TCP ACK packets and data packets; and transmitting the MAC PDU to a physical layer.

19 Claims, 2 Drawing Sheets

TCP ACK PACKET TRANSMISSION AND RECEPTION METHOD, AND A DEVICE SUPPORTING THE SAME

FIELD OF THE INVENTION

The present invention relates to a broadband wireless network, and more particularly, to a TCP ACK packet transmitting and receiving method, and a device supporting the same.

BACKGROUND OF THE INVENTION

A mobile WiMAX network based on IEEE (Institute of Electrical and Electronics Engineers) 802.16e/m or WiMAX standard allows transmitting much information in a short time owing to a broadband frequency, and also enables to improve efficiency in channel use since channels are shared among all users. Accordingly, the mobile WiMAX network has attracted considerable attention as a next-generation portable Internet system, whereby the mobile WiMAX network is currently deployed in many countries including U.S.A., Korea, Singapore, and etc.

WiMAX Forum dated on April, 2008 proposed the first WiMAX network capable of supporting mobility over WiMAX based on WiMAX network profile 1.0. After that, IEEE 802.16 Maintenance Technology Group (TG) develops a revision of IEEE 802.16e-2005 to improve a system performance, and expects to complete the revision by the end of 2010.

The system requirements of the mobile WiMAX network based on IEEE 802.16m mandates that the system shall provide the traffic throughput higher than two times of the mobile WiMAX network based on IEEE 802.16e. Especially, IEEE 802.16m concentrates on performance improvement in PHY layer and MAC layer, and improvement of End-To-End performance, to thereby satisfy the user's requirements and simultaneously arouse the consumer's interest in the market. Accordingly, IEEE 802.16m emphasizes the importance of performance beyond the PHY layer and MAC layer. Furthermore, IEEE 802.16m considers the improvement in traffic throughput of upper layer (TCP/IP layer) as well as traffic throughput of PHY layer and MAC layer.

A broadband wireless communication network based on IEEE 802.16e/m converts data to be transmitted into IP packet through the use of IP (Internet Protocol); manages a data stream through the use of TCP (Transmission Control Protocol); performs a re-transmission of data by an ARQ (Automatic Retransmission Request) method; and configures the received data.

A TCP/IP protocol is for a wired network, which is not appropriate for the mobile WiMAX network for transmitting and receiving the data through wireless link. Especially, if a TCP ACK packet is wireless-transmitted by the present MAC layer, the data transmission performance is largely affected by the TCP ACK packet loss and transmission delay. That is, if the TCP ACK packet transmission is not optimized through the wireless link in the broadband wireless communication network, it is difficult to improve the data transmission performance.

The TCP ACK packet and data packet are transmitted separately. Thus, if the transmission frequency of TCP ACK packet is high and the transmission performance of TCP ACK packet is deteriorated, the throughput efficiency of payload data transmission is reduced. Also, if the loss of data to be transmitted may be high due to the characteristics of the wireless link, the lost data is re-transmitted by the ARQ (Automatic Retransmission Request) method. Generally, since the data to be re-transmitted is transmitted with priority, the delay of TCP ACK packet, that is, ACK compression may occur, whereby the upper layer (TCP/IP layer) transmission performance may be deteriorated.

In case of one-way traffic, the TCP packet transmitted in one direction may share the same physical path with the TCP packet transmitted in the opposite direction. In this case, the data and TCP ACK packet may share a buffer in the network.

The buffer sharing causes the ACK compression, to thereby delay the TCP ACK packet transmission. As a result, the delay of TCP ACK packet transmission affects the throughput of payload data transmission of a sender, to thereby deteriorate the end-to-end data transmission performance.

The data transmission performance in the traffic throughput under two-way connection may be dropped to 66.67% of that under one-way traffic in which TCP ACK packet and data (payload) packet flow is separated.

A mobile station (MS) and base station (BS) of the broadband wireless communication network can classify packets transmitted through a service flow (SF) by a connection identifier (hereinafter, referred to as 'CID'). Also, a traffic queue applied in the MAC layer may be applied to uplink (UL) and downlink (DL) contained in the same CID or SF.

This may introduce the TCP ACK compression. In order to prevent the TCP ACK compression, an independent service flow for separation of uplink (UL) and downlink (DL) traffic has to be created. However, it is impractical to create the SF for every application/service between MS and BS.

For minimizing these problems, the following methods have been proposed: (1) method of splitting the connection and (2) link layer solution method.

First, (1) method of splitting the connection is a mechanism referred to as 'Indirect-TCP' for splitting one TCP connection into two separate connections. The drawback in (1) method of splitting the connection is that acknowledgements received by the sender do not always imply that the packets have successfully reached the intended destination, which violates the End-To-End concept of TCP protocol.

Second, (2) link layer solution method uses ARQ (Automatic Repeat reQuest) and FEC (Forward Error Correction) at the link layer so as to obtain local data reliability and make the wireless link appear to TCP as a reliable link. This method is advantageous in that any modification to the TCP layer is not required. However, if applying the two-way TCP connection, the packet delay may be increased in the MAC layer.

DISCLOSURE

Technical Problem

Accordingly, the present invention is directed to a method for receiving and transmitting a TCP ACK packet, and a device supporting the same that substantially obviates one or more problems due to limitations and disadvantages of the related art.

An aspect of the present invention is to provide a method for receiving and transmitting a TCP ACK packet for an efficient packet data transmission of End-to-End in a wireless communication network, and a device supporting the same.

Another aspect of the present invention is to provide a method for receiving and transmitting a TCP ACK packet, which improves data transmission efficiency in a wireless communication network.

Another aspect of the present invention is to provide a device supporting transmission and reception of a TCP ACK packet.

Technical Solution

To achieve these objects and other advantages and in accordance with the purpose of the invention, as embodied and broadly described herein, there is provided a method for transmitting a TCP ACK packet comprising: receiving TCP ACK packets and data packets from an upper layer; creating a MAC PDU by unifying the TCP ACK packet and data packet buffered in the same queue among the received TCP ACK packets and data packets; and transmitting the MAC PDU to a physical layer.

In another aspect of the present invention, there is provided a method for receiving a TCP ACK packet comprising: receiving a MAC PDU including a data packet unified with the TCP ACK packet; checking whether or not TCP/IP header and ACK field are included in the received MAC PDU; extracting the TCP/IP header from the MAC PDU when the TCP/IP header and ACK field are included in the received MAC PDU; and restoring the TCP ACK packet including the TCP ACK information through the use of extracted TCP/IP header.

In another aspect of the present invention, there is provided a device for supporting a TCP ACK packet transmission comprising: a detecting unit for detecting a first packet including TCP ACK information, and a second packet including data payload among plural packets waited in the same queue; and a packet unifying unit for forming a TCP/IP header of SDU by extracting the TCP ACK information from the first packet, and forming a payload of the SDU by extracting the data payload from the second packet.

In another aspect of the present invention, there is provided a device for supporting a TCP ACK packet transmission comprising: a packet extracting unit for checking whether or not a received MAC PDU includes TCP/IP header and ACK field, and extracting the TCP/IP header from the MAC PDU when the received MAC PDU includes TCP/IP header and ACK field; and a packet restoring unit for restoring the TCP ACK packet including the TCP ACK information through the use of extracted TCP/IP header.

Advantageous Effects

The TCP ACK packet transmitting and receiving method according to the present invention and the device supporting the same enables to improve the data transmission efficiency in the mobile WiMAX network.

The wireless communication network according to the embodiment of the present invention can provide efficiency in the packet data transmission in the wireless communication network.

Also, the wireless communication network according to the embodiment of the present invention allow the improved traffic throughput in the PHY layer and MAC layer, and also obtains the improved performance of application/service.

According as the TCP ACK information of the TCP ACK packet is transmitted while being unified with the data packet, to thereby increase the utilization of radio resources.

Also, it is possible to prevent limitations of the data transmission, which might occur due to the transmission delay or loss of the TCP ACK packet.

MODE FOR INVENTION

Reference will now be made in detail to the preferred embodiments of the present invention, examples of which are illustrated in the accompanying drawings.

Hereinafter, a method for receiving and transmitting a TCP ACK packet in a wireless communication network, and a device supporting the same will be described with reference to the accompanying drawings.

Before an explanation for the accompanying drawings, a method for receiving and transmitting a TCP ACK packet according to the embodiment of the present invention unifies TCP ACK information of a TCP ACK packet with a data packet, and transmits the TCP ACK information included in TCP/IP header, to thereby increase the utilization of radio resources. Also, the method of the present invention is capable of preventing limitations of data transmission, which might occur due to the transmission delay or loss of the TCP ACK packet. Thus, the method of the present invention enables to improve the data transmission efficiency in the mobile WiMAX network.

The method for receiving and transmitting the TCP ACK packet according to the embodiment of the present invention and the device supporting the same may be applied to mobile WiMAX MAC or MAC/IP cross layer.

Hereinafter, an unexplained matter related with the present invention will refer to IEEE 802.16 standard document corresponding to a technology standard of broadband wireless communication system, and WiMAX Forum NWG (Network Working Group) standard document.

A mobile WiMAX network consists of a physical layer (PHY layer) and a media access control layer (MAC layer).

The PHY layer manages a physical contact to hardware; and establishes, maintains and manages a physical link for data transmission.

The MAC layer carries out a classification function in consideration to network protocol and transmission properties, and carries out a header compression function. For the data transmission, the MAC layer divides data by MAC PDU (Protocol Data Unit); and adds MAC header and MAC CRC to each MAC PDU.

In the mobile WiMAX network according to the embodiment of the present invention, a data transmission performance in a bi-directional connection, especially, TCP ACK message transmission performance can be improved through the use of TCP ACK manager (ACK Unifier, ACK Extractor). In this case, the TCP ACK manager (ACK Unifier, ACK Extractor) may be applied when receiving and transmitting the TCP ACK message.

Also, the TCP ACK packet and data packet which have the same CID or same service flow (SF) are unified into one packet (SDU). Then, TCP ACK information of the TCP ACK packet and data packet (payload) are respectively created as MAC PDUs. After that, each MAC PDU is transmitted via the PHY layer, to thereby improve the data transmission performance of upper layer (TCP/IP layer).

Figure 1:
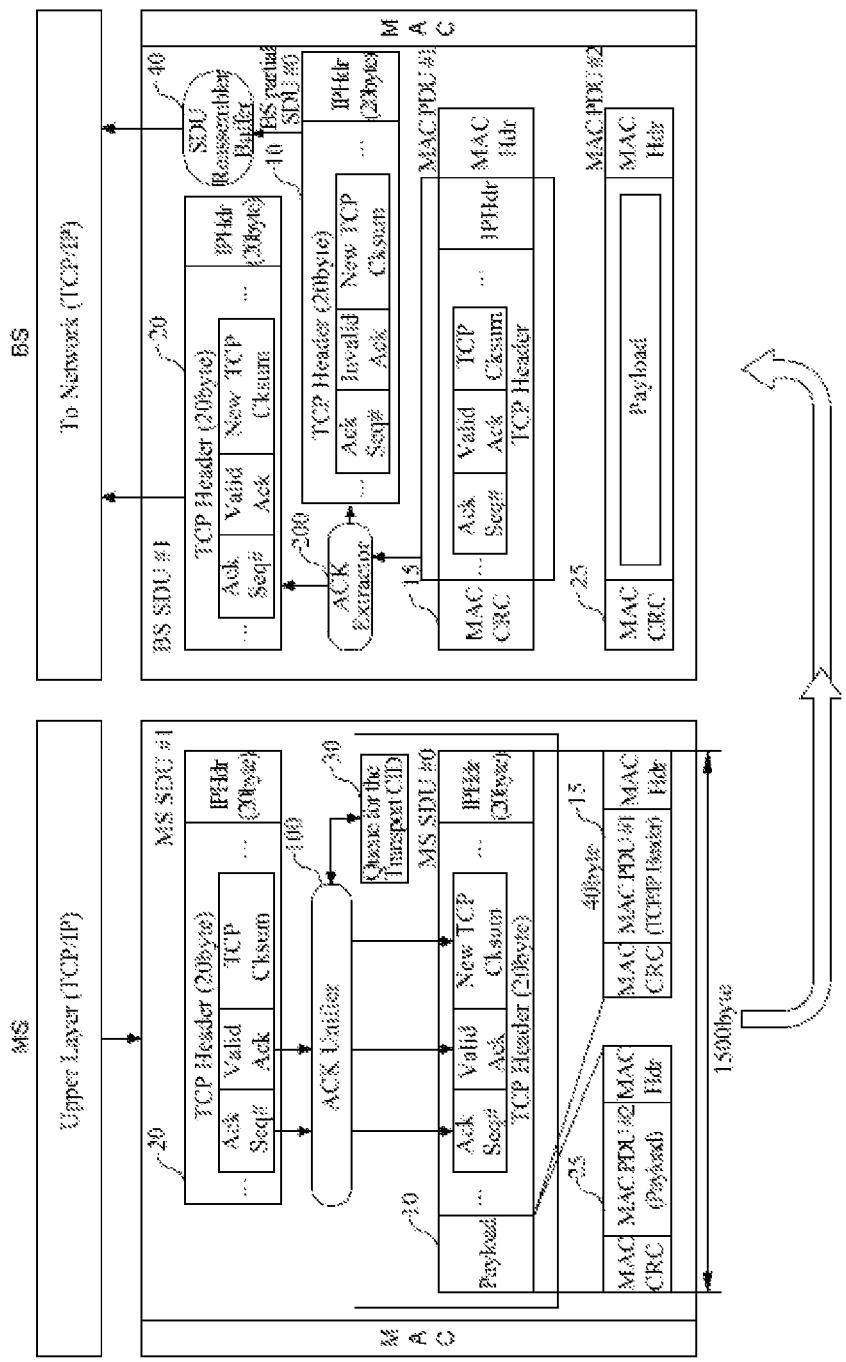
FIG. 1 illustrates a method of receiving and transmitting a TCP ACK packet according to the embodiment of the present invention, and a TCP ACK manager supporting the same.

For this, as shown in FIG. 1, the TCP ACK manager is provided in the MAC layer. In this case, the TCP ACK manager includes an ACK unifier 100 and an ACK extractor 200. The ACK unifier 100 and ACK extractor 200 are independent features, which may be provided in each of mobile station (MS) and base station (BS). Also, the MAC layer of the MS and BS may include a queue and an SDU reassemble buffer.

FIG. 1 illustrates a method for receiving and transmitting the TCP ACK packet according to the embodiment of the present invention.

The method for receiving and transmitting the TCP ACK packet according to the embodiment of the present invention will be explained with reference to FIG. 1.

Referring to FIG. 1, in case of the mobile WiMAX network based on IEEE 802.16e/m, data is received and transmitted under a link is divided. At this time, the link is divided into a downlink (DL) for transmitting the data from the BS to the MS, and an uplink (UL) for transmitting the data from the MS to the BS. An explanation with reference to FIG. 1 relates to the uplink (UL).

The MAC layer of the MS receives the data packet (SDU) from the upper layer (TCP/IP), and configures the data packet (MAC PDU) of the MAC layer with the received data packet. Then, the MAC layer transmits the MAC PDU to the PHY layer, and the PHY layer transmits the MAC PDU by mapping the MAC PDU to a frame.

At this time, the MS and BS can receive and transmit the bi-directional TCP traffic through the service flow (SF) via air. At this time, the data packet transmission throughput of the upper layer can be limited according to whether or not the TCP ACK packet is successfully transmitted in the UL and DL.

In the present invention, the TCP ACK packet may be transmitted while being included in the other packet (data packet including the data payload). For example, if MTU of 1500 Byte is applied in the MAC layer, the TCP ACK packet of 40 Byte including TCP header and IP header may be transmitted while being included in the data packet having 1500 Byte length. In more detail, the TCP ACK information is extracted from the TCP ACK packet; and the TCP ACK information is transmitted while being unified with the TCP header of the data packet having the data payload.

As shown in FIG. 1, when the packet is transmitted from the TCP/IP layer to the MAC layer, the MAC layer divides the packet by the SDU units. At this time, the TCP packet indicates the TCP/IP packet. An explanation for the features related with the IP packet is unnecessary, which will be omitted.

Each SDU transmitted from the TCP/IP layer may be classified into the TCP ACK packet and the data packet. The TCP ACK packet includes the TCP ACK information, wherein the TCP ACK packet may be provided with IP header of 20 Byte and TCP header of 20 Byte. That is, the data packet includes the data to be transmitted, that is, payload, wherein the data packet may be provided with IP header of 20 Byte, TCP header of 20 Byte, and payload with the constant size.

Before each SDU is assembled for the MAC PDU in the MAC layer, the SDU is buffered in the queue 30 according to the CID or SF. After each SDU is assembled for the MAC PDU, the SDU is transmitted to the destination (which corresponds to the MS in case of the downlink, and corresponds to the BS in case of the uplink) via the PHY layer. At this time, the PDUs (TCP ACK packet, data packet) having the same CID or same SF are buffered in the same queue.

The ACK unifier 100 checks the SDUs transmitted from the TCP/IP layer; and determines that each of the transmitted SDUs corresponds to the SDU according to the TCP ACK packet including the TCP ACK information to notify whether the received data packet is successfully transmitted to a sender, or corresponds to the SDU according to the data packet including the payload.

Hereinafter, the SDU including the TCP ACK information is defined as the first SDU (20, MS SDU #1); and the SDU including the payload is defined as the second SDU (10, MS SDU #0).

Generally, if the TCP ACK packet and the data packet have the same CID (or SF), the TCP ACK packet and the data packet are buffered in the same queue 30 of the MAC layer at the received-side, and are queued for being transmitted. Herein, the large-sized data packet and the small-sized TCP ACK packet may be queued in the same queue 30. In this case, the transmission of the small-sized TCP ACK packet may be delayed until completing the transmission of the large-sized data packet.

For preventing the transmission delay of the TCP ACK packet, the plural packets, which are queued in the same queue 30 for transmission, are unified into one packet, and the unified one packet is transmitted.

The packets waited in the same queue 30, that is, SDUs have the same CID or SF, whereby the SDUs are unified and transmitted. When the plural SDUs are unified into one SDU, the transmission of TCP ACK packet including the TCP ACK information should be firstly considered.

For this, the ACK unifier 100 detects the first SDU (20, MS SDU #1) including the TCP ACK information, and the second SDU (10, MS SDU #0) among the plural SDUs waited in the same queue 30.

After that, the ACK unifier 100 unifies the first SDU (20, MS SDU #1) and second SDU (10, MS SDU #0) into one SDU. In more detail, the ACK unifier 100 extracts the TCP ACK information (ACK sequence number, valid ACK) from the TCP ACK packet of the first SDU (20, MS SDU #1). Then, the extracted TCP ACK information is unified with the TCP header of the second SDU (10, MS SDU #0). In this case, the new SDU may be created by unifying the TCP packet and the TCP ACK packet.

When the TCP ACK information is unified with the TCP header of the second SDU (10, MS SDU #0), the TCP header of the second SDU (10, MS SDU #0) is changed in its CRC value. Thus, the TCP ACK checksum (CRC) is re-set by reflecting the unified TCP ACK information on the second SDU (10, MS SDU #0). Then, the TCP ACK packet of the first SDU (20, MS SDU #1) from which the TCP ACK information is extracted is discarded.

In order to transmit the second SDU (10, MS SDU #0) unified with the TCP ACK information to the PHY layer, the MAC PDU is created in the MAC layer through the use of second SDU (10, MS SDU #0). The MAC PDU may be created by the following method.

First, the first MAC PDU (15, MAC PDU #1) is created by using the IP header and the TCP header unified with the TCP ACK information. Also, the second MAC PDU (25, MAC PDU #2) is created by using the data packet (payload) of the second SDU (10, MS SDU #0). At this time, the MAC header and MAC CRC are included in each of the first and second MAC PDUs 15, 25. A transmission error of IP header and TCP header may be checked through the use of MAC PDU CRC.

The MAC layer transmits the first MAC PDU (15, MAC PDU #1) and second MAC PDU (25, MAC PDU #2) created from the second SDU (10, MS SDU #0) unified with the TCP ACK information to the PHY layer. Then, the PHY layer firstly transmits the first MAC PDU (15, MAC PDU #1), and secondly transmits the second MAC PDU (25, MAC PDU #2).

The reason why the first MAC PDU (15, MAC PDU #1) and second MAC PDU (25, MAC PDU #2) are created from the second SDU (10, MS SDU #0) unified with the TCP ACK information is to reduce a loss rate of the packet having the TCP ACK information.

In more detail, under the circumstance of 5% BLER, if it is allowable to carry out the re-transmission two times, a loss possibility of the MAC PDU having 1500 Byte length is about 10% over WiMAX (MAC).

Like the related art, the loss possibility of the TCP ACK packet may be increased in comparison to the additional transmission of the small-sized TCP ACK packet of 40 Byte. Supposing that the first MAC PDU 15 and second MAC PDU 25 are transmitted separately. In this case, if the first MAC PDU 15 is lost, only the first MAC PDU 15 is re-transmitted. Thus, the loss probability of the first MAC PDU (15, MAC PDU #1) packet comprising the packet with the TCP ACK information becomes 0.5%, which is lowered to be similar to the case of individually transmitting the TCP ACK packet.

Among the MAC PDUs 15 and 25, the first MAC PDU 15 including the TCP ACK information is transmitted prior to the second MAC PDU 25 including the data packet (payload). Without regard to whether or not the second MAC PDU 25 is received, it is possible to separate the TCP ACK information from the first MAC PDU 15 in a receiver (wherein, the receiver corresponds to the MS in case of downlink, and corresponds to the BS in case of uplink). Thus, the transmission delay of the TCP ACK packet can be further reduced.

A detailed explanation for a restoration mechanism of the first MAC PDU 15 and second MAC PDU 25 will be shown together with an explanation for the following ACK extractor 200.

The ACK extractor 200 provided in the MAC layer of the BS will be explained with reference to FIG. 1.

When the MAC PDU is received in the ACK extractor 200 from the MS, the ACK extractor 200 checks whether or not the received MAC PDU includes the TCP ACK information.

In more detail, when the MAC PDUs 15 and 25 are received in the ACK extractor 200, the ACK extractor 200 checks the payload of the MAC PDUs 15 and 25 after the MAC header of the respective MAC PDUs 15 and 25, to thereby check whether the TCP/IP header is included or not, and whether the valid ACK field of the TCP header is displayed or not.

If the first MAC PDU 15 satisfies the aforementioned conditions, the TCP/IP header is extracted from the first MAC PDU 15, and then is restored to the original first SDU 20 received in the sender through the use of TCP ACK information included in the TCP/IP header, that is, TCP/IP header packet including the TCP ACK information. After that, the restored first SDU 20 is directly transmitted to the network.

Simultaneously, the TCP/IP header checksum is re-set in the TCP/IP header of the first MAC PDU (15, MAC PDU #1) from which the TCP ACK information is extracted. This is to reflect that the TCP ACK information is extracted from the TCP/IP header. Then, the Valid ACK of the TCP/IP header is set as Invalid ACK. That is, the Valid ACK of the second SDU (10, BS SDU #0) is made to the Invalid ACK.

After that, the TCP/IP header of the first MAC PDU 15, that is, the first SDU is buffered in the SDU reassembler buffer.

The reason why the TCP header, that is, the Valid ACK of the IP header is made to the Invalid ACK is to prevent the repetition of TCP ACK information when the original SDU is restored by reassembling the second MAC PDU 25 including the data payload of the second SDU 10 and the TCP/IP header from which the TCP ACK information is extracted.

Since the received second MAC PDU 25 does not include the TCP/IP header, that is, does not include the TCP ACK information, the second MAC PDU 25 is buffered in the SDU reassmbler buffer.

Then, the original SDU is restored by reassembling the second MAC PDU 25 including the data payload of the second SDU 10 and the TCP/IP header from which the TCP ACK information is extracted. After that, the restored SDU including the original TCP/IP header and data payload is transmitted to the network.

As mentioned above, when the TCP ACK information is embedded in the large-sized SDU by originating either TCP or ACK unifier 100, the ACK extractor 200 restores the TCP ACK information as soon as the TCP/IP header (first MAC PDU #1) is delivered without error even before the entire SDU is delivered; and transmits the restored TCP ACK packet to the network (TCP/IP layer), to thereby reduce the delay and loss of TCP ACK packet. This is because the TCP ACK packet is restored as soon as the TCP ACK packet is received even before the delivery of the entire SDU, and is then transmitted to the network.

The aforementioned ACK unifier 100 and ACK extractor 200 may independently operate without any synchronization or control between these functional entities. According as they are applied with the downlink (DL) or uplink (UL), the MS and BS are changed in their functions as receiver or sender. Thus, the ACK unifier 100 and ACK extractor 200 may be included in both the MS and BS.

The aforementioned method for receiving and transmitting the TCP ACK packet according to the embodiment of the present invention enables to reduce the probability of losing or delaying the TCP ACK packet by the wireless link characteristics and TCP ACK compression. In addition, the aforementioned method of the present invention can increase the utilization of radio resource between the mobile WiMAX MS and BS without any change of TCP protocol.

For the above explanation, the method for receiving the transmitting the TCP ACK packet according to the present invention is applied to the uplink (UL). According to another embodiment of the present invention, the method for receiving the transmitting the TCP ACK packet according to the present invention may be identically applied to the downlink (DL).

The aforementioned method for receiving and transmitting the TCP ACK packet according to the present invention and the device supporting the same may be applied to not only the mobile WiMAX network but also the other broadband wireless communication networks, for example, CDMA 2000 and 3GPP/LTE.

Simulation results for performance of the packet data transmission support method according to the embodiment of the present invention will be explained as follows.

In order to verify the performance of the packet data transmission support method according to the embodiment of the present invention, End-To-End WiMAX network based on IEEE 802.16e and WiMAX Network Working Group (NWG) is applied therein. The data transmission performance in the method for receiving and transmitting the TCP ACK packet according to the present invention is measured through the use of WISEW (WiMAX) (Wireless Integrated System Emulator for mobile WiMAX) corresponding to a network performance simulator. The WISEW is known as a validation tool for the WiMAX simulator being developed by WiMAX Forum for general use in all WiMAX members of the WiMAX Forum.

For analyzing the performance improvement by the packet data transmission support device, the bi-directional FTP application for exchanging 5 Mbyte-file is used; and the ACK unifier 10 and ACK extractor 200 are also used together with WiMAX MAC ARQ scheme.

In the simulation, 16QAM 1/2 and 64QAM 5/6 modulation for the downlink (DL) and 16QAM 1/2 modulation for the uplink (UL) are assumed, and for the sake of simplicity only downlink air-link distortion was introduced.

Figure 2:
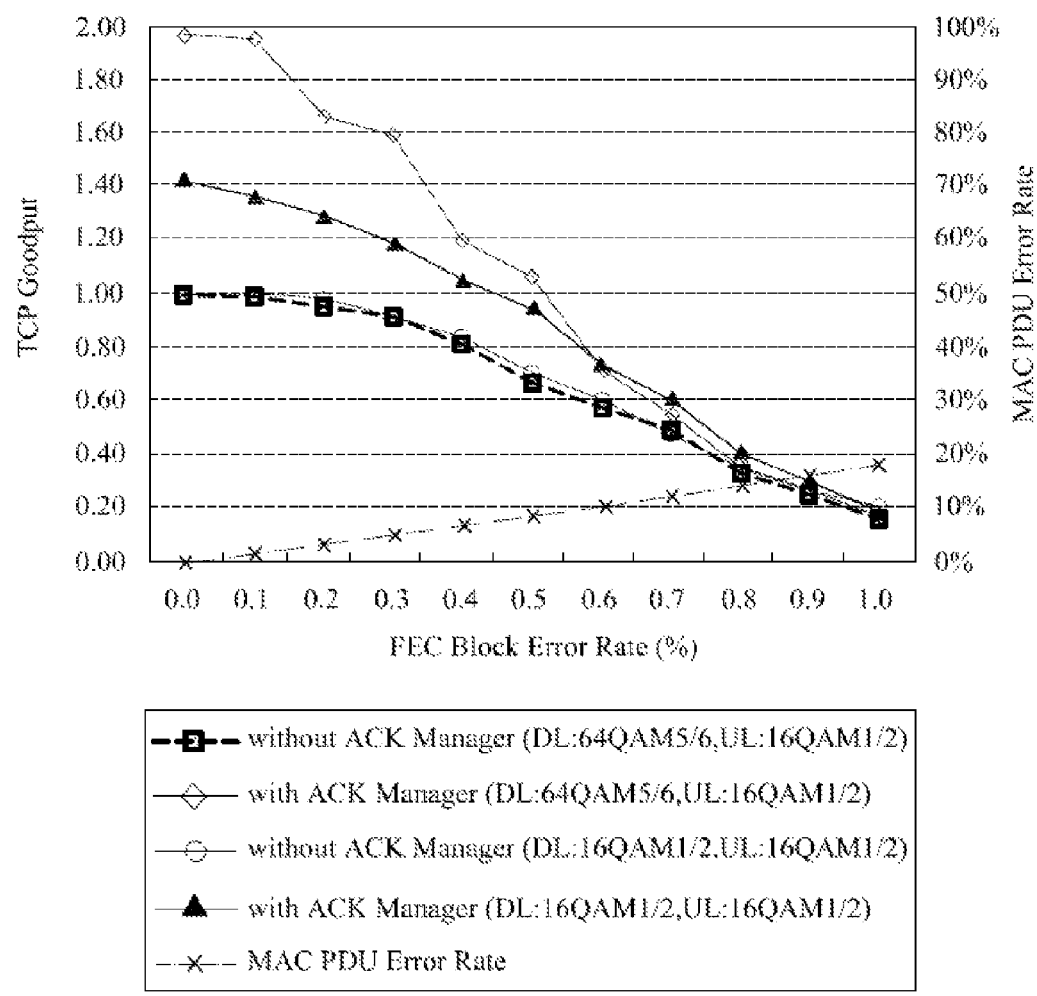
FIG. 2 illustrates a data transmission performance when the method of receiving and transmitting the TCP ACK packet according to the present invention is applied.

FIG. 2 shows a downloading TCP goodput improvement versus FEC block error rate when the method for receiving and transmitting the TCP ACK packet according to the present invention is applied. Also, FIG. 2 illustrates a MAC PDU error rate versus FEC block error rate.

If not applying the method for receiving and transmitting the TCP ACK packet according to the present invention, when the FEC block error rate is increased, the data performance of 64QAM downlink (DL) is very similar to the data performance of 16QAM downlink (DL). Also, it can be known that the TCP goodput is dropped to about 20% when the FEC block error rate reaches 1%. Herein, even though the data transmission performance of 64QAM downlink (DL) is higher than the data transmission performance of 16QAM downlink (DL), there is no large virtual difference in data transmission performance due to the aforementioned problems.

This is because the TCP ACK packet delay from MS to BS is occurred by the large packet on the FTP uploading. The TCP performance is limited by the TCP ACK packet delay from MS to BS, whereby a downlink (DL) bandwidth of the 64QAM downlink (DL) is not higher than a downlink (DL) bandwidth of the 16QAM downlink (DL).

If applying the method for receiving and transmitting the TCP ACK packet according to the present invention, it is advantageous in that the 64QAM downlink (DL) has the downlink (DL) bandwidth higher than that of 16QAM downlink (DL). When the FEC block error rate is zero, the data transmission performance is increased up to 40% with 16QAM 1/2 DL and more than 90% with 64QAM 5/6 DL in comparison to the related art.

The performance improvement is reduced while the DL FEC block error rate increases since the impact of the delayed TCP ACK packet is decreased because of the degraded downlink quality.

The TCP goodput performance improvement is diminished when the FEC block error rate reaches 1%. However, the air-link bandwidth is reduced since the TCP ACK packet is transmitted while being unified with other TCP packet belongs to the same service flow.

The aforementioned TCP ACK packet transmission support method in the mobile WiMAX network according to the embodiment of the present invention may be executed by various computer means.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A method for transmitting a TCP ACK packet comprising:
   receiving TCP ACK packets and data packets from an upper layer;
   creating a MAC PDU by unifying the TCP ACK packet and data packet buffered in the same queue among the received TCP ACK packets and data packets; and
   transmitting the MAC PDU to a physical layer,
   wherein the unifying process is carried out by unifying TCP ACK information contained in a TCP header of the TCP ACK packet buffered in the same queue with header information contained in a TCP header of the data packet buffered in the same queue.

2. The method according to claim 1, wherein the MAC PDU comprises:
   a first MAC PDU including the TCP ACK information contained in the TCP header of the TCP ACK packet, and the TCP header unified with the header information contained in the TCP header of the data packet; and
   a second MAC PDU including data payload of the data packet.

3. The method according to claim 2, wherein the TCP ACK information includes ACK sequence number and valid ACK.

4. The method according to claim 2, further comprising resetting TCP checksum (CRC) in the TCP header unified with reflecting the TCP ACK information reflected thereon.

5. The method according to claim 2, further comprising resetting valid ACK in the TCP header unified with the TCP ACK information reflected thereon.

6. The method according to claim 2, further comprising discarding the TCP ACK packet.

7. The method according to claim 2, wherein each of the first and second MAC PDUs includes a MAC header and MAC CRC.

8. The method according to claim 2, further comprising transmitting the first and second MAC PDUs via the physical layer.

9. The method according to claim 8, wherein the first MAC PDU is transmitted prior to the second MAC PDU.

10. The method according to claim 1, wherein plural packets waited in the same queue have the same service flow of connection identification.

11. A method for receiving a TCP ACK packet comprising:
    receiving a MAC PDU including a data packet unified with the TCP ACK packet;
    checking whether or not TCP/IP header and ACK field are included in the received MAC PDU;
    extracting the TCP/IP header from the MAC PDU when the TCP/IP header and ACK field are included in the received MAC PDU;
    restoring the TCP ACK packet including the TCP ACK information through the use of extracted TCP/IP header; and
    resetting TCP header checksum of the TCP/IP header from which the TCP ACK information is extracted.

12. The method according to claim 11, wherein whether or not the ACK field is included in the received MAC PDU is determined by checking the valid ACK of the TCP/IP header.

13. The method according to claim 11, further comprising transmitting the TCP ACK packet including the TCP ACK information to a network.

14. The method according to claim 11, further comprising changing the Valid ACK of the TCP/IP header to Invalid ACK.

15. The method according to claim 14, further comprising buffering the TCP/IP header in a SDU reassembler buffer.

16. The method according to claim 15, further comprising, when the MAC PDU without the TCP/IP header is received, restoring the MAC PDU to the original data packet by reassembling the MAC PDU without the TCP/IP header and ACK field with the TCP/IP header buffered in the SDU reassemble buffer.

17. The method according to claim 16, further comprising transmitting the restored original data packet to the network.

18. A device for supporting a TCP ACK packet transmission comprising:

a detecting unit for detecting a first packet including TCP ACK information, and a second packet including data payload among plural packets queued in the same queue; and a packet unifying unit for forming a TCP/IP header of SDU by extracting the TCP ACK information from the first packet, and forming a payload of the SDU by extracting the data payload from the second packet, wherein a TCP checksum (CRC) included in the TCP header of the SDU is reset by reflecting the TCP ACK information thereon.

19. The device according to claim 18, wherein a valid ACK is set in the TCP header of the SDU by reflecting the TCP ACK information thereon.

* * * * *